(No Model.) E. H. EVERETT. 2 Sheets—Sheet 2.
MACHINE FOR SHAPING BOTTLE NECKS.
No. 400,556. Patented Apr. 2, 1889.
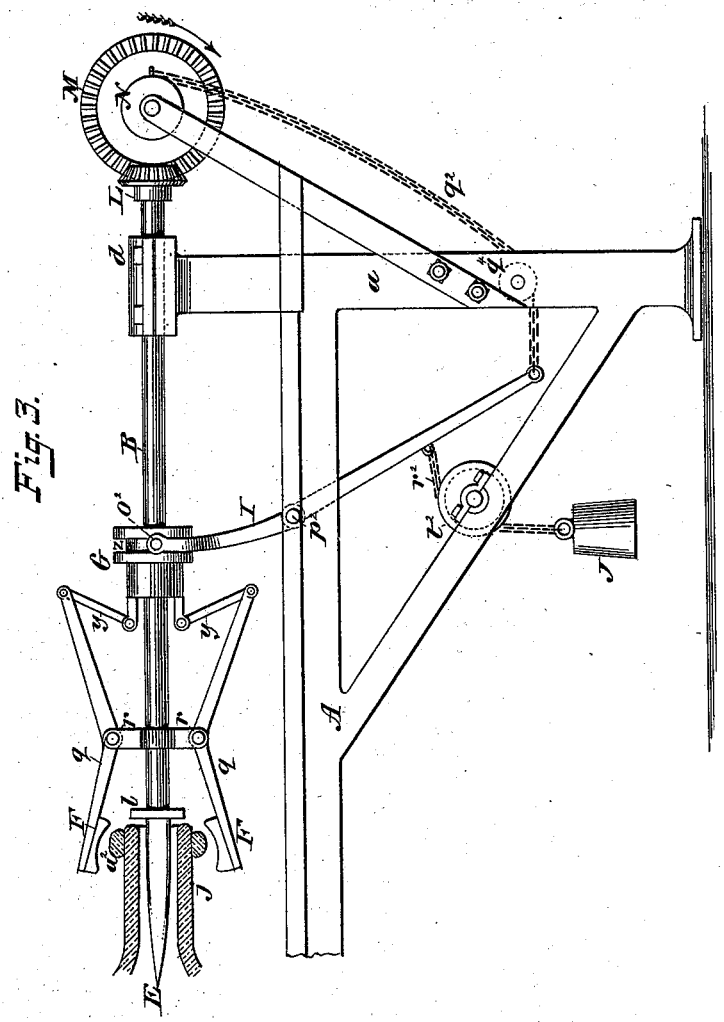
WITNESSES:
Gustave Dieterich
T. F. Bourne.
INVENTOR.
Edward H. Everett
BY Briesen, Steele & Knauth
ATTORNEYS.

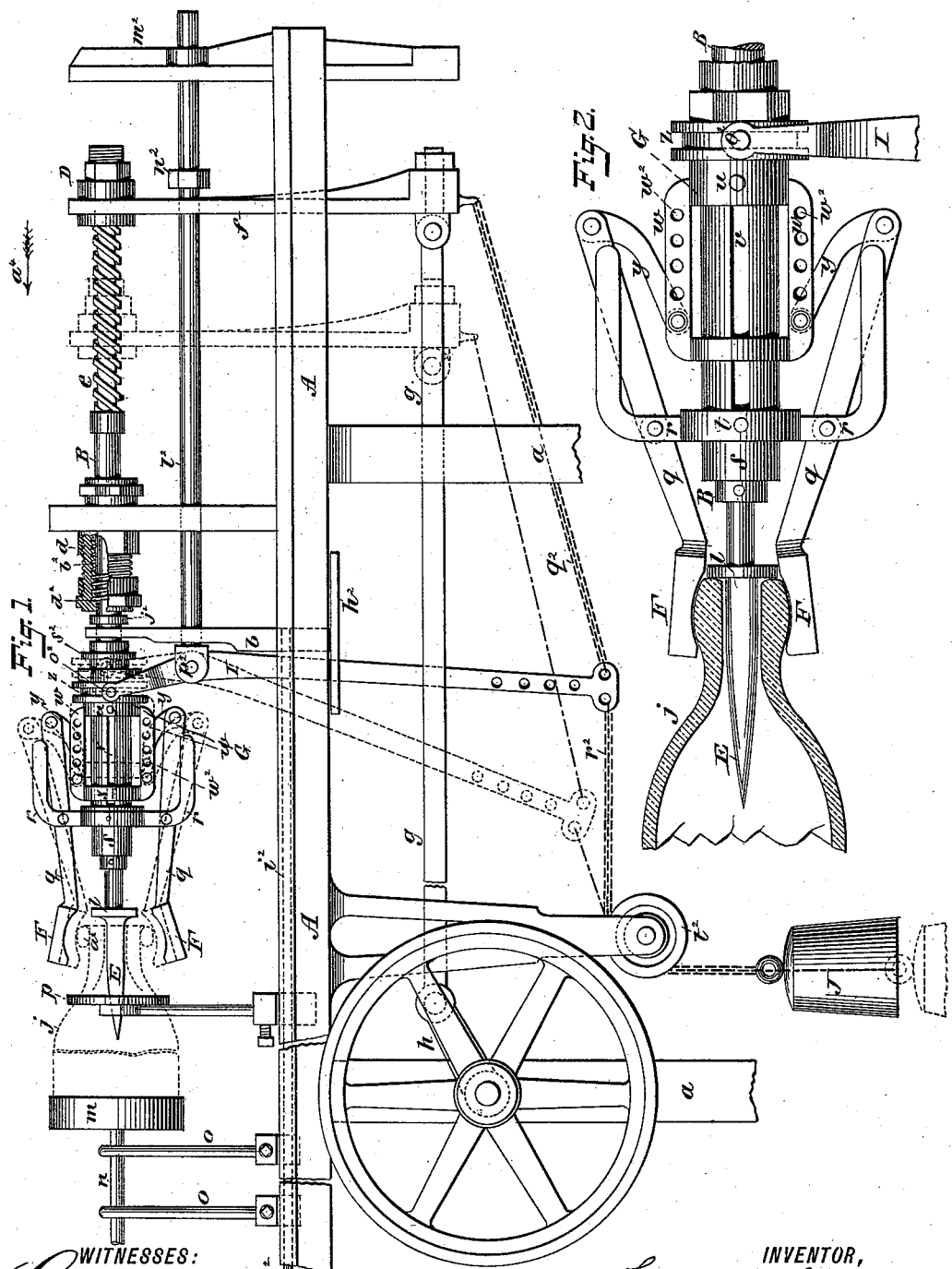

UNITED STATES PATENT OFFICE.

EDWARD H. EVERETT, OF NEWARK, OHIO.

MACHINE FOR SHAPING BOTTLE-NECKS.

SPECIFICATION forming part of Letters Patent No. 400,556, dated April 2, 1889.

Application filed November 9, 1888. Serial No. 290,370. (No model.)

*To all whom it may concern:*

Be it known that I, EDWARD H. EVERETT, of Newark, Licking county, Ohio, have invented an Improved Machine for Shaping Bottle-Necks, of which the following is a specification.

The object of my invention is to provide certain new and useful improvements in bottle-neck-shaping machines.

The invention consists in the details of improvement and the combinations of parts, that will be more fully hereinafter set forth.

Reference is to be had to the accompanying drawings, forming part of this specification, in which—

Figure 1 is a side elevation, partly broken, of my improved machine. Fig. 2 is an enlarged detail view of a portion thereof, and Fig. 3 is a side elevation of a modification of my machine.

In the accompanying drawings, the letter A represents a base or guide plate, that is mounted upon suitable supports, $a$.

B is a spindle or shaft, that is journaled in bearings $b$ $d$, supported by the base A. The spindle B is rotated as follows: At one part said spindle is provided with a worm, $e$, that receives a nut or sleeve, D, having corresponding internal threads, or a pin that fits in said worm. This nut or sleeve D is secured to a longitudinally-movable arm, $f$, that projects from the base or guide plate A. To this arm $f$ is secured a connecting-rod, $g$, that is pivoted to a crank, $h$, on a shaft, $i$, suitably journaled in the supports $a$ or otherwise carried. The shaft $i$ is driven by belt and pulley from suitable source or by other means. As the shaft $i$ rotates, the nut or sleeve D, through the connecting-rod $f$ $g$ and crank $h$, will be reciprocated without turning. As the sleeve D is thus reciprocated, its internal threads working in the worm $e$ will rotate the spindle B alternately in opposite directions; but, if preferred, the spindle B could be rotated directly by belt and pulley or otherwise.

In order to ease the working of the threads between the worm $e$ and nut D, and also for shaping certain styles of bottle-necks, I may give the spindle B longitudinal motion. To accomplish this, I provide the bearing $d$ for the spindle B with an internal worm, $b^2$, that meshes with a worm, $d^2$, on the spindle B, as clearly shown in Fig. 1. I prefer that the worm $e$ be so cut with relation to the worms $b^2$ $d^2$ that as the sleeve D travels along the spindle B four inches the spindle will travel longitudinally one inch; but this relation of speeds may be changed to suit the requirements.

At the end of the spindle B, opposite the worm $e$, is placed a plug or core, E, that is adapted to enter the mouth of a bottle, $j$. At its inner end the plug or core E preferably has a plate or stop, $l$, that limits the passage of the core into the bottle-neck. The base of the bottle $j$ is held in a cup or snap, $m$, the handle or rod $n$ of which is to be rested upon supports or bearings $o$ that are carried by a rod, $i^2$, that extends longitudinally along the base A. When a bottle, $j$, is placed in position upon the core E, the neck of the bottle is or may be passed through a ring or other shaped support or bearing, $p$, that is carried by the rod $i^2$. When the bottle is in the proper position upon the core E, the body portion of the bottle at the neck will fit in the ring-support $p$, as shown in Fig. 1. The supports $o$ $o$ and $p$ are preferably vertically adjustable.

F F are shaping-jaws, that are adapted to straddle the bottle-neck, and also to rotate around said neck. The jaws F F are supported on or are continuations of levers $q$, that are pivoted to arms $r$, that are carried by the spindle B. The arms $r$ may be secured directly to the spindle B, as shown in Fig. 3, or they may be secured to a sleeve, $s$, that fits on the spindle B, as clearly shown in Figs. 1 and 2. When this sleeve $s$ is used, I preferably secure it to the spindle B by a pin, $t$, that passes through the arms $r$ and said sleeve.

G is a sleeve that fits over the sleeve $s$ and slides freely thereon, being guided by a screw or pin, $u$, passing from the sleeve G into a slot, $v$, in the sleeve $s$, as shown in Figs. 1 and 2. By this screw $u$ the sleeve G is also carried around with the spindle B and sleeve $s$. A shoulder, $s^2$, on the sleeve $s$ will prevent the sleeve G slipping off the same. The sleeve G preferably has a skeleton extension that consists of two rods, $w$, connecting the sleeve proper, G, with a ring, $x$, that encircles the sleeve $s$.

For the purposes of this specification I consider the parts G, $w$, and $x$ as one sleeve, which I term "G." To the sleeve G, or, more properly speaking, to the rods $w$, are pivoted links $y$, that at their other ends are pivoted to the levers $q$. The rods $w$ may be provided with a series of holes, $w^2$, into which the pivots of the links $y$ may be placed, so as to give more or less movement to the levers $q$, as desired. When the sleeve G is moved forward or into the position shown in Fig. 1, the links $y$ act to draw inward the ends of the levers $q$, and thereby to raise the jaws F in the bottle-neck; but when the sleeve G is moved into the rearward position shown in Fig. 2 the links $y$ act to press outward the outer ends of the levers $q$, and thereby crowd the jaws F toward the plug E and upon the bottle $j$, when it is in position on said plug or upon the plate $l$, thereby limiting the movement of the sleeve G.

The sleeve G is moved along the spindle B, to open and close the jaws F, as follows: On the outer side of the sleeve G is an annular groove, $z$, that receives a pin, $o^2$, on a lever, I, that is pivotally connected to the bearing $b$, as at $p^2$. The lever I may be forked, if desired, to embrace the sleeve G, there being a pin, $o^2$, for the groove $z$ at each end of the fork. The bearing $b$ for the spindle B is made longitudinally movable when a longitudinally-movable spindle is used, and is guided in a slot of the base A, a plate, $h^2$, being carried by it below the base A, so as to hold and guide it on the base. To this sliding bearing $b$ the rod $i^2$, that carries the supports $o\ p$, is secured. These supports by means of set-screws are longitudinally adjustable on the rod $i^2$. A collar, $j^2$, on the spindle B acts to push the bearing $b$ forward as the spindle advances, thereby imparting motion by the rod $i^2$ to the supports $o\ o$ and $p$. In the return of the spindle B the sleeve $s$ acts to push the bearing $b$ rearward to return the supports $o\ o$ and $p$ with the spindle. I also prefer to secure to the bearing $b$ a rod, $l^2$, that extends parallel with the spindle B, passes through the arm $f$, and is guided in the stationary support $m^2$ at the end of the base A. Upon the rod $l^2$, I place an adjustable collar, $n^2$, that is adapted to be engaged by the arm $f$, as it returns in driving the spindle, this collar thereby acting to limit the travel of the arm $f$. The lever I extends downwardly from its pivot $p^2$ and is attached by a chain, $q^2$, or otherwise to the arm $f$. The lever I is also connected by a chain or other flexible connection, $r^2$, with a weight, J, said chain $r^2$ passing over a pulley, $t^2$, suitably supported by the framing of the machine.

My improved machine operates in shaping a bottle-neck as follows: The bottle $j$, while in a plastic state and having a plastic glass ring, $a^2$, (see Fig. 1,) in position on the neck of the bottle, is secured in the cup or snap $m$. The bottle-neck is then passed through the support or ring $p$ and upon the plug E, while the jaws F are opened, the handle $n$ of the cup $m$ being placed upon the supports $o\ o$. The machine is now started by advancing the sleeve D, say, in the direction of the arrow $a^4$, Fig. 1, to turn the spindle B, the support $b$ and its connections advancing under the influence of $b^2\ d^2$ with one-fourth the speed of $f$; hence the rear connection of the chain $q^2$ advances much faster than the pivot $p^2$ of the lever I, and the chain $q^2$ will subsequently slacken, allowing the weight J to swing the lever I on its pivot, and thereby to move the sleeve G backward and close the jaws F upon the bottle-neck. The plug E while rotating within the bottle-neck acts to shape the interior of said neck. While the jaws F are pressed against the bottle-neck and during their rotation with the spindle B they act to shape the bottle-neck. By the connection of the weight J, chain $r^2$, and lever I with the sleeve G a spring-like pressure is given to the jaws F. In other words, they are made yielding, so that when an uneven or raised part of the bottle-neck should come against the jaws they will be enabled to give or spread, and thereby prevent irregular work and damage. This is a very important feature, for if the jaws were rigidly held upon the bottle-neck there would be danger of making imperfect bottle-necks. As the sleeve D and the arm $f$ move in the reverse direction to the arrow $a^4$, the chain $q^2$ will draw upon the lever I, thereby moving the upper end of said lever in the direction of the arrow $a^4$ to advance the sleeve G and open the jaws F to release the bottle-neck. Thus it will be seen that the action of the weight J and arm $f$, through the medium of the lever I, serves to move the sleeve G and open and close the jaws F while the spindle B and the jaws F are rotating. By adjusting the chain up or down upon the lever I the distance the sleeve G should travel may be regulated. By lowering the chain on the lever I the pressure of the jaws on the bottle-neck may be increased. When a longitudinally-movable spindle, B, is used and the lever I is pivoted to the movable bearing $b$, said lever will always retain the proper position with relation to the spindle B and sleeve G; but the machine may be worked successfully without advancing the spindle B, if desired.

In the modification shown in Fig. 3 the spindle B does not advance, but is rotated in stationary bearings $d$. In this case the arms $r$ are secured directly to the spindle B; but, if preferred, the sleeve $s$ could be interposed between said parts. In said figure the jaws F are opened and closed by the sliding sleeve G similarly to that shown with reference to Fig. 1, the lever I for moving said sleeve being pivoted at $p^2$ on the base A, instead of upon the movable bearing $b$, as in Fig. 1.

In Fig. 3 the spindle B is rotated differently from that shown in Fig. 1. In said Fig.

3 the spindle B is provided at the end opposite the plug E with a bevel-pinion, L, that meshes with a bevel-gear, M, suitably journaled in bearings in the framing of the machine and driven alternately in opposite directions, one revolution at a time, by any suitable means. The wheel M or its supporting-shaft carries a disk, N, to the rim of which is attached one end of the chain $q^2$, the other end of said chain being connected to the lever I, as shown, said chain passing over a sheave, $q^4$, journaled in bearings in the supports $a$. The chain $q^2$ is also connected at one end to the lever I, and at its other end supports the weight J, said end passing over the pulley $t^2$, journaled in the framing of the machine, as shown.

In using this style of machine the disk N is turned in the direction of the arrow in Fig. 3, whereby the chain $q^2$ is slackened, which allows the weight J to draw upon the lever I, thereby moving the sleeve G rearward and closing the jaws F to form a bottle-neck. By the time the disk N has made a half-revolution the chain $q^2$ will have slackened as much as possible, and as the disk N continues to rotate it will wind the chain upon itself, thereby drawing the lever I and moving the sleeve G forward to open the jaws F. When the disk N has made its complete revolution, it is brought to rest. In order to close the jaws again, the disk will now be turned in the reverse direction of the arrow in Fig. 3, whereby the same action of the lever I and weight J will take place, the disk N being turned alternately in opposite directions for one revolution each time the jaws F are to be opened and closed. During the revolution of the disk N and gear-wheel M the spindle B is being rotated by the connection of the gear-wheel M with the pinion L, whereby the interior of the bottle-neck is shaped by the plug and the jaws F F rotated around the bottle-neck. The supports $o$ $o$ and $p$ for the bottle in this case may be similar to those shown in Fig. 1; but they do not receive longitudinal movement, as the spindle B does not move forward. The weight and chain in this figure have the same effect of giving an elastic or spring action of the jaws F upon the bottle-neck as that described with reference to Fig. 1.

It is evident that the weight J could be replaced by a spring, if desired.

The chains $q^2$ $r^2$ may be replaced by any other suitable connection.

Having now described my invention, what I claim is—

1. The shaping-jaws F F, combined with means, substantially as described, for revolving and for opening and closing them, the closing mechanism having a weighted member, I, which will allow the jaws, when closed and in the act of closing, to yield to pressure from within, as specified.

2. The spindle B, opening and closing jaws F, and sleeve G, jointed to said jaws, combined with the lever I, connected with the sleeve G and with the weight J on the lever I, and means, substantially as described, for rotating the jaws F, all arranged to render the jaws yielding to internal pressure when closed and when closing, as specified.

EDWARD H. EVERETT.

Witnesses;
JOEL M. DENNIS,
CHAS. W. FULLER.